United States Patent
Saito

(10) Patent No.: US 7,680,519 B2
(45) Date of Patent: Mar. 16, 2010

(54) HANDSFREE APPARATUS INCLUDING VOLUME CONTROL

(75) Inventor: Soichi Saito, Obu (JP)

(73) Assignee: DENSO Corporation, Kariya (JP)

( * ) Notice: Subject to any disclaimer, the term of this patent is extended or adjusted under 35 U.S.C. 154(b) by 300 days.

(21) Appl. No.: 11/582,943

(22) Filed: Oct. 17, 2006

(65) Prior Publication Data

US 2007/0099674 A1 May 3, 2007

(30) Foreign Application Priority Data

Oct. 18, 2005 (JP) ............................ 2005-303050
Sep. 15, 2006 (JP) ............................ 2006-250985

(51) Int. Cl.
*H04M 1/00* (2006.01)

(52) U.S. Cl. .............. 455/569.2; 455/569.1; 455/200.1; 455/575.9

(58) Field of Classification Search .............. 455/569.2, 455/569.1, 200.1, 575.9
See application file for complete search history.

(56) References Cited

U.S. PATENT DOCUMENTS

| | | | |
|---|---|---|---|
| 6,917,822 B1 * | 7/2005 | Mori et al. | 455/564 |
| 2003/0114202 A1 | 6/2003 | Suh et al. | |
| 2003/0216134 A1 * | 11/2003 | Mutoh | 455/404.1 |
| 2005/0215290 A1 * | 9/2005 | Wakabayashi et al. | 455/563 |
| 2005/0221868 A1 * | 10/2005 | Childress et al. | 455/569.2 |
| 2006/0154698 A1 | 7/2006 | Ogura et al. | |
| 2007/0105548 A1 * | 5/2007 | Mohan et al. | 455/426.1 |

FOREIGN PATENT DOCUMENTS

| | | |
|---|---|---|
| JP | 2002-269663 | 9/2002 |
| JP | 2003-218996 | 7/2003 |
| JP | 2006-184103 | 7/2006 |

* cited by examiner

*Primary Examiner*—Dwayne Bost
*Assistant Examiner*—Christopher Henry
(74) *Attorney, Agent, or Firm*—Harness, Dickey & Pierce, PLC

(57) ABSTRACT

In a vehicular navigation system, "AT command +CIEV" is received from a cellular phone by a BLUETOOTH communications. The received "+CIEV" is determined to identify a phoning state (or call state) of the cellular phone. A sound corresponding to the identified phoning state is outputted via a speaker in a corresponding sound volume level stored in an external memory device. A sound volume level, which was finally set for a certain phoning state, is not continuously used as an initial sound volume level for a subsequent phoning state different from the certain phoning state. An incoming sound, dialing sound, calling sound, and communicating sound are individually outputted in appropriately set sound volume levels, which enhances usability of the navigation system for users.

10 Claims, 5 Drawing Sheets

HANDSFREE APPARATUS INCLUDING VOLUME CONTROL

CROSS REFERENCE TO RELATED APPLICATION

This application is based on and incorporates herein by reference Japanese Patent Applications No. 2005-303050 filed on Oct. 18, 2005, and No. 2006-250985 filed on Sep. 15, 2006.

FIELD OF THE INVENTION

The present invention relates to a handsfree apparatus for a vehicle.

BACKGROUND OF THE INVENTION

A cellular phone having a BLUETOOTH communications function, or a cellular phone to which an external BLUETOOTH communications adapter is attachable has become available ("BLUETOOTH" is a registered trade mark). The cellular phone with a BLUETOOTH communications function is brought in a vehicle compartment to connect to an in-vehicle handsfree apparatus. (See Patent documents 1 and 2.)

Patent document 1: JP-2003-198713 A
Patent document 2: JP-2003-218996 A

An in-vehicle handsfree apparatus outputs sounds (tones, rings, alerts) based on phoning states (or call states), i.e., incoming sound (or alert), dialing sound, calling sound, and communicating (received) sound based on incoming state, dialing state, calling state, and communicating state, respectively. In general, two sound volumes are set; one is for an incoming sound alone and the other is for a dialing sound, calling sound, and communicating sound. Once a certain sound volume was set at a previous phone call, the certain sound volume previously set is used initially at the next phone call.

In this case, when a user increases a volume of sounds while communicating against circumferential noise and then ends the phone call, a calling sound in the next phone call is outputted in the increased volume regardless of whether circumferential noise is large or not. This situation is not favorable to a user.

SUMMARY OF THE INVENTION

It is an object of the present invention to provide for a vehicle a handsfree apparatus, which outputs a sound in a volume appropriate to a phoning state (or call states), which can enhance usability for a user.

According to an aspect of the present invention, a handsfree apparatus communicating with a cellular phone is provided as follows. A sound output unit outputs a sound. Phoning state receiving means receives, from the cellular phone, phoning state information indicating, of a plurality of phoning states, a phoning state of a cellular phone. Sound volume storing means stores a sound volume corresponding to each of the plurality of phoning states. Control means identifies a phoning state of the cellular phone from the phoning state information received by the phoning state receiving means, and causes the sound output unit to output a sound corresponding to the identified phoning state in a sound volume, which is stored in the sound volume storing means and corresponds to the identified phoning state.

According to another aspect of the present invention, a method for setting a sound volume in a handsfree apparatus for a vehicle to communicate with a cellular phone is provided with the following: storing a sound volume corresponding to each of a plurality of phoning states of the cellular phone; and receiving phoning state information indicating a phoning state of the cellular phone; identifying a phoning state of the cellular phone from the received phoning state information; and outputting via a sound output unit a sound corresponding to the identified phoning state in a sound volume, which is stored and corresponds to the identified phoning state.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
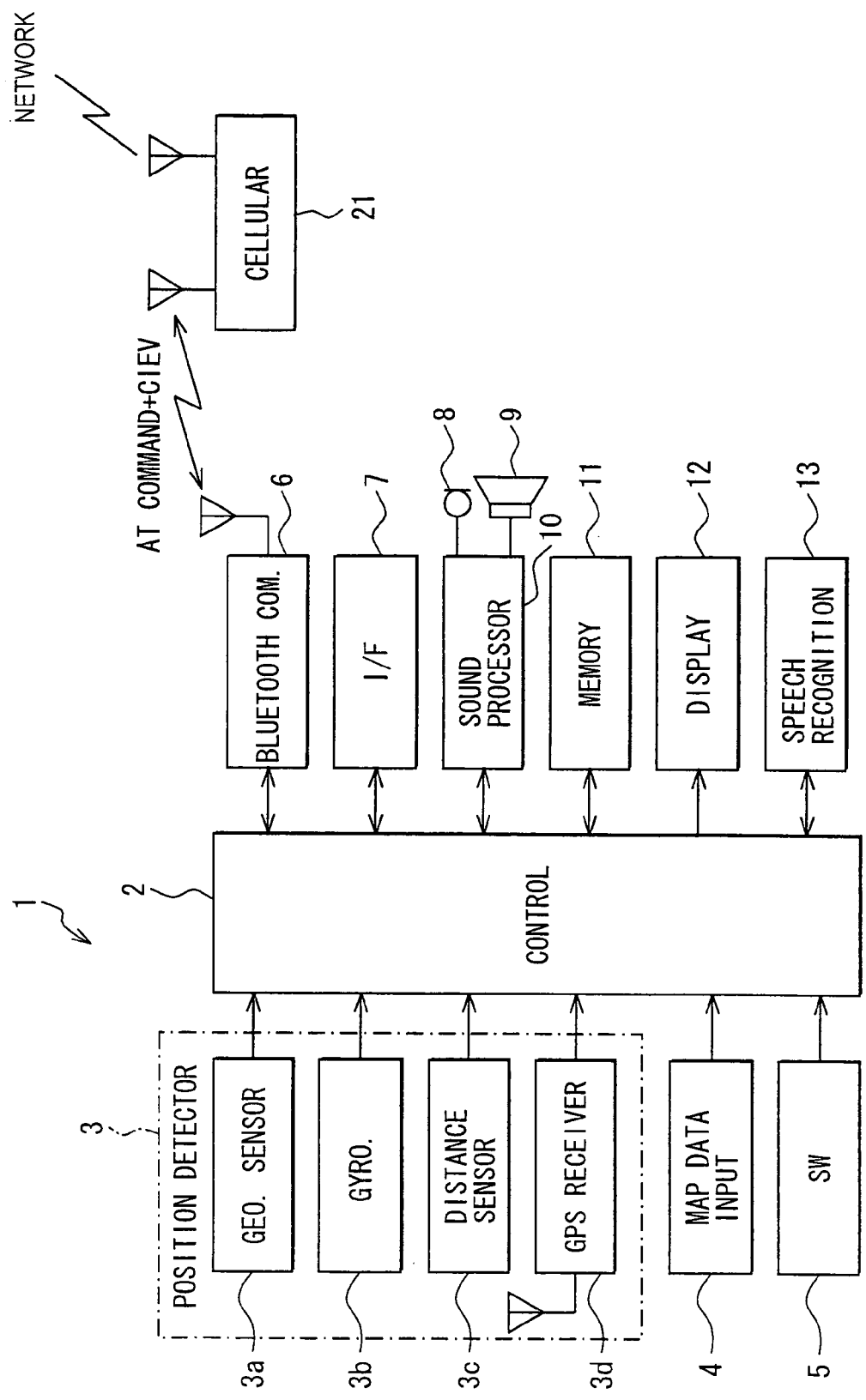
FIG. 1 is a functional block diagram illustrating a configuration of a navigation system and a cellular phone as an example according to a first embodiment of the present invention.
Figure 2:
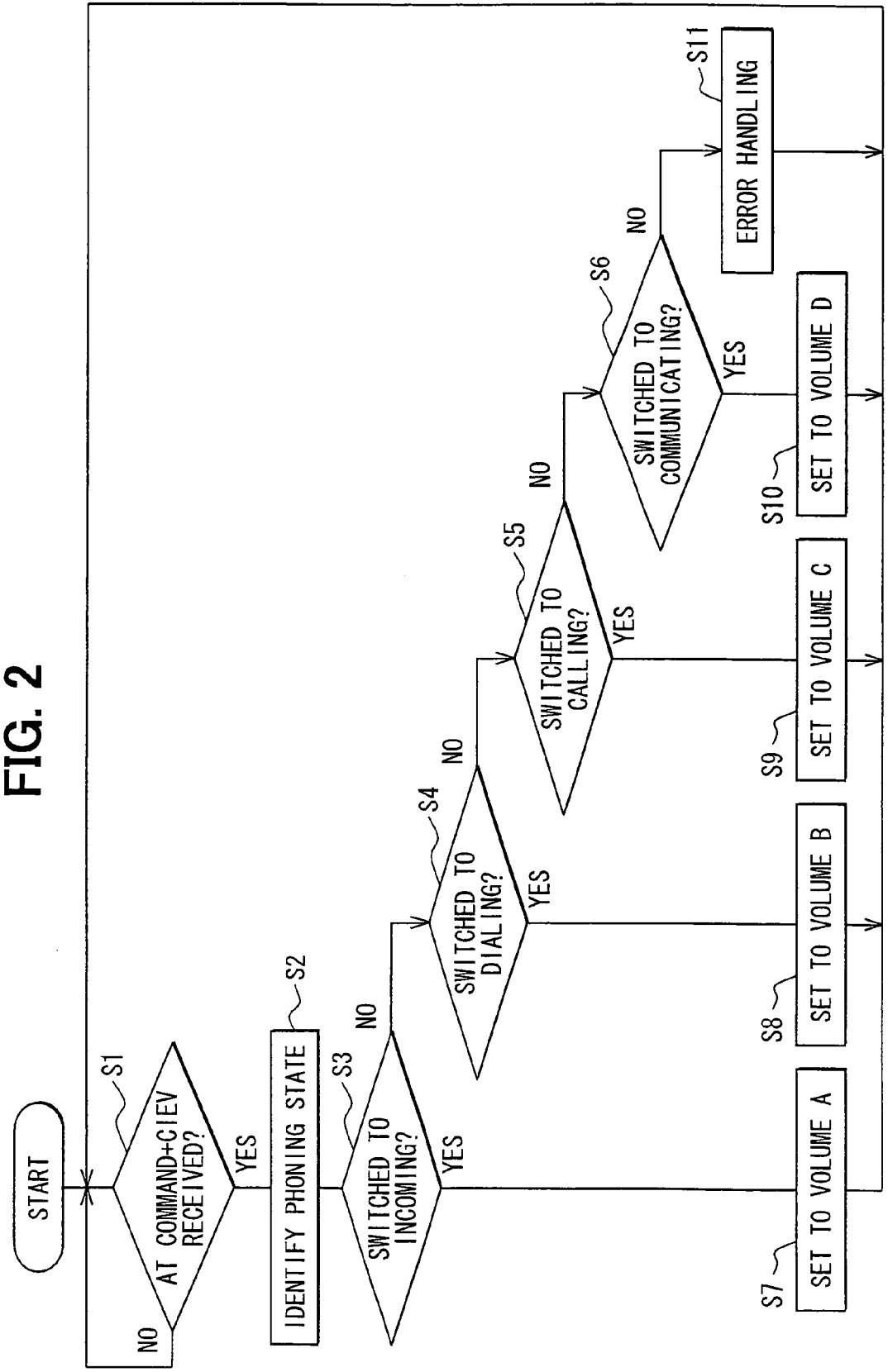
FIG. 2 is a flowchart diagram performed in the configuration shown in FIG. 1.

A vehicular navigation system having a handsfree function as an example of a first embodiment according to the present invention will be explained with reference to FIGS. 1 and 2. As shown in FIG. 1, a vehicular navigation system 1 mounted in a subject vehicle includes the following: a control unit 2 for controlling the overall system, a position detector 3, a map data input unit 4, an operation switch unit 5 for receiving an operation by a user, a BLUETOOTH communications unit 6 for communicating with a cellular phone 21 having a BLUETOOTH communications function, a vehicular interface unit 7 for interfacing with an in-vehicle device or in-vehicle sensor, a sound processor 10 for processing transmission sounds inputted from a microphone 8 or reception sounds outputted to a speaker 9, an external memory device 11, a display unit 12 such as a liquid crystal display, and a speech recognition unit 13. The position detector 3 includes a geomagnetic sensor 3a, a gyroscope 3b, a distance sensor 3c, and a GPS (Global Positioning System) receiver 3d. The BLUETOOTH communications unit 6 functions as phoning state receiving means. The external memory device 11 functions as sound volume storing means.

The external memory device 11 stores sound volumes based on phoning states (or call states). For instance, a sound volume while incoming is stored as a sound volume level A; a sound volume while dialing is stored as a sound volume level B; a sound volume while calling is stored as a sound volume level C; and a sound volume while communicating is stored as a sound volume level D. These sound volume levels A to D may be set individually to any volumes by a user, or may be set as default values, which are set before product shipment.

In contrast, the cellular phone 21 has (i) a cellular wireless communications function to wirelessly communicate with a cellular phone network, and (ii) a BLUETOOTH communications function to communicate with the navigation system 1. The cellular phone 21 sends information on phoning states to the navigation system 1 while establishing a communications link with the navigation system 1. This information on phoning states is "AT command +CIEV", which indicates that phoning states are switched over. For instance, the cellular phone 21 sends to the navigation system 1 the following: "callsetup=1" when a phoning state is switched to an incoming state; "callsetup=2" when a phoning state is switched to a dialing state; "callsetup=3" when a phoning state is switched to a calling state; and "call=1" when a phoning state is switched to a communicating state.

In the above configuration, the control unit 2 of the navigation system 1 causes the speaker 9 to output sounds as follows while the BLUETOOTH communications unit 6 establishes a BLUETOOTH communications link with the cellular phone 21: an incoming sound indicating that a call is incoming from a calling party to call for the cellular phone 21 as a called party; a dialing sound indicating that the cellular phone 21 as a calling party is dialing for a called party; a calling sound indicating that the cellular phone 21 as a calling party is calling for a called party; and a communicating sound (i.e., received sound) or a voice from the other party. Further, the control unit 2 causes the display unit 12 to switch display windows to visually notify a user of phoning state change based on the phoning state identified by determining the received "+CIEV" when detecting that the BLUETOOTH communications unit 6 has received "AT command +CIEV".

Next, an operation of the above configuration will be explained with reference to FIG. 2. While the navigation system 1 establishes a BLUETOOTH communications link with the cellular phone 21, a start trigger arises to start a handsfree communications. Then the control unit 2 determines whether the BLUETOOTH communications unit 6 receives "AT command +CIEV" from the cellular phone 21 (Step S1). When the determination is affirmed (YES at Step S1), the control unit 2 identifies a phoning state by determining "+CIEV" received (Step S2).

When detecting that "+CIEV" is "callsetup=1" to detect that the phoning state is switched to an incoming state (YES at Step S3), the control unit 2 sets a sound volume, which is outputted via the speaker 9, to a sound volume level A, which is stored in the external memory device 11, causing the speaker 9 to output an incoming sound in the sound volume level A (Step S7). When detecting that "+CIEV" is "callsetup=2" to detect that the phoning state is switched to a dialing state (YES at Step S4), the control unit 2 sets the sound volume to a sound volume level B, which is stored in the external memory device 11, causing the speaker 9 to output a dialing sound in the sound volume level B (Step S8).

When detecting that "+CIEV" is "callsetup=3" to detect that the phoning state is switched to a calling state (YES at Step S5), the control unit 2 sets the sound volume to a sound volume level C, which is stored in the external memory device 11, causing the speaker 9 to output a calling sound in the sound volume level C (Step S9). When detecting that "+CIEV" is "call=1" to detect that the phoning state is switched to a communicating state (YES at Step S6), the control unit 2 sets the sound volume to a sound volume level D, which is stored in the external memory device 11, causing the speaker 9 to output a communicating sound or received sound in the sound volume level D (Step S10). Further, when detecting that "+CIEV" does not correspond to "callsetup=1", "callsetup=2", "callsetup=3", or "call=1" (NO at Step S6), the control unit 2 executes an error handling (Step S11).

As explained above, the navigation system 1 is provided as follows: "AT command +CIEV" is received from the cellular phone 21 by the BLUETOOTH communications unit 6; the received "+CIEV" is determined to identify a phoning state; and a sound corresponding to the identified phoning state is outputted via the speaker 9 in a corresponding sound volume level stored in the external memory device 11. A sound volume finally set for a certain phoning state is then not continuously used as an initial sound volume for a subsequent phoning state different from the certain phoning state. An incoming sound, dialing sound, calling sound, and communicating sound corresponding to an incoming state, dialing state, calling state, and communicating state, respectively, are individually outputted in appropriately set sound volume levels, which enhances usability of the navigation system 1 for users.

Second Embodiment

Figure 3:
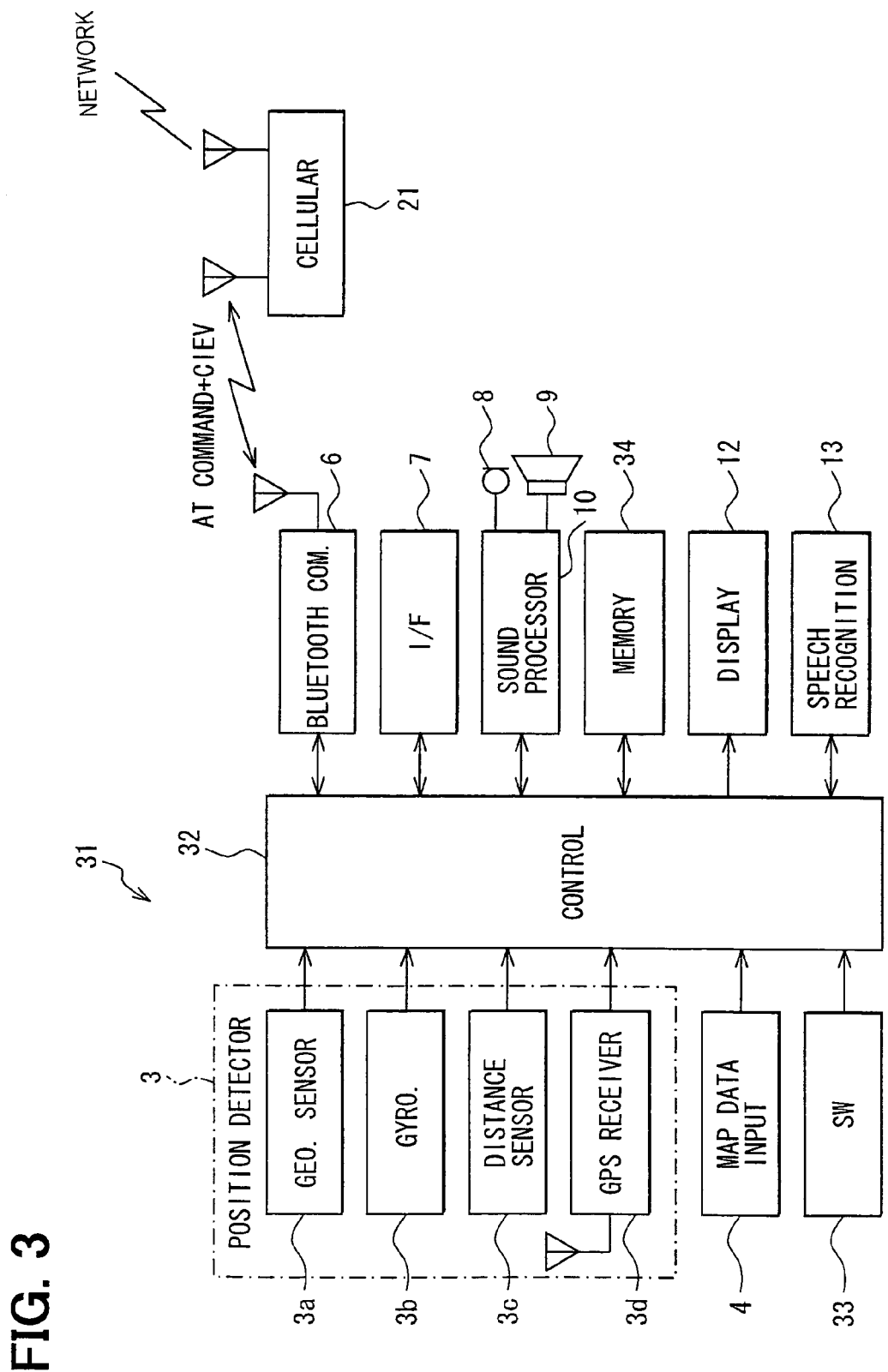
FIG. 3 is a functional block diagram illustrating a configuration of a navigation system and a cellular phone as an example according to a second embodiment of the present invention.
Figure 4:
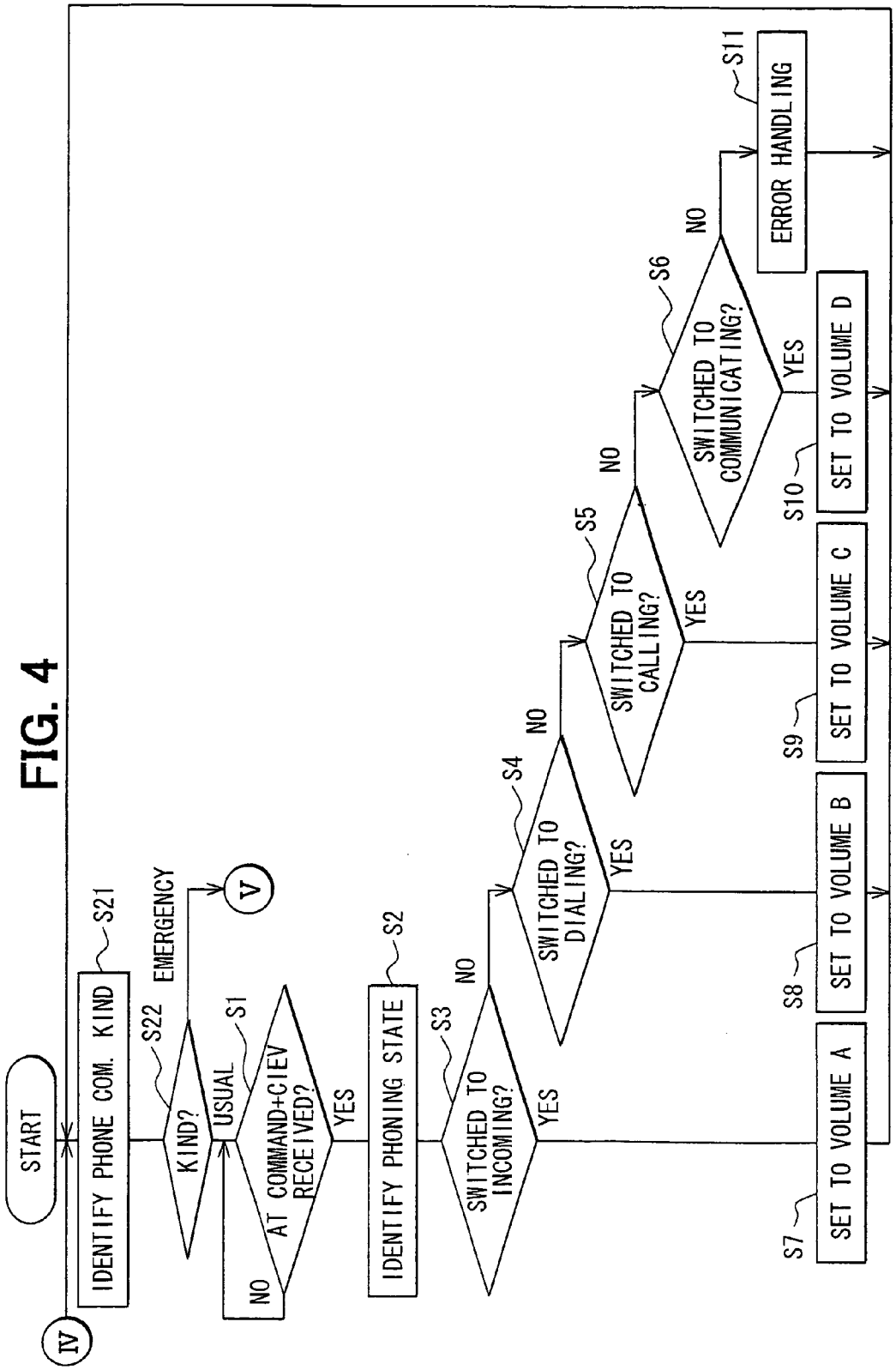
FIG. 4 is a flowchart diagram performed in the configuration shown in FIG. 3.
Figure 5:
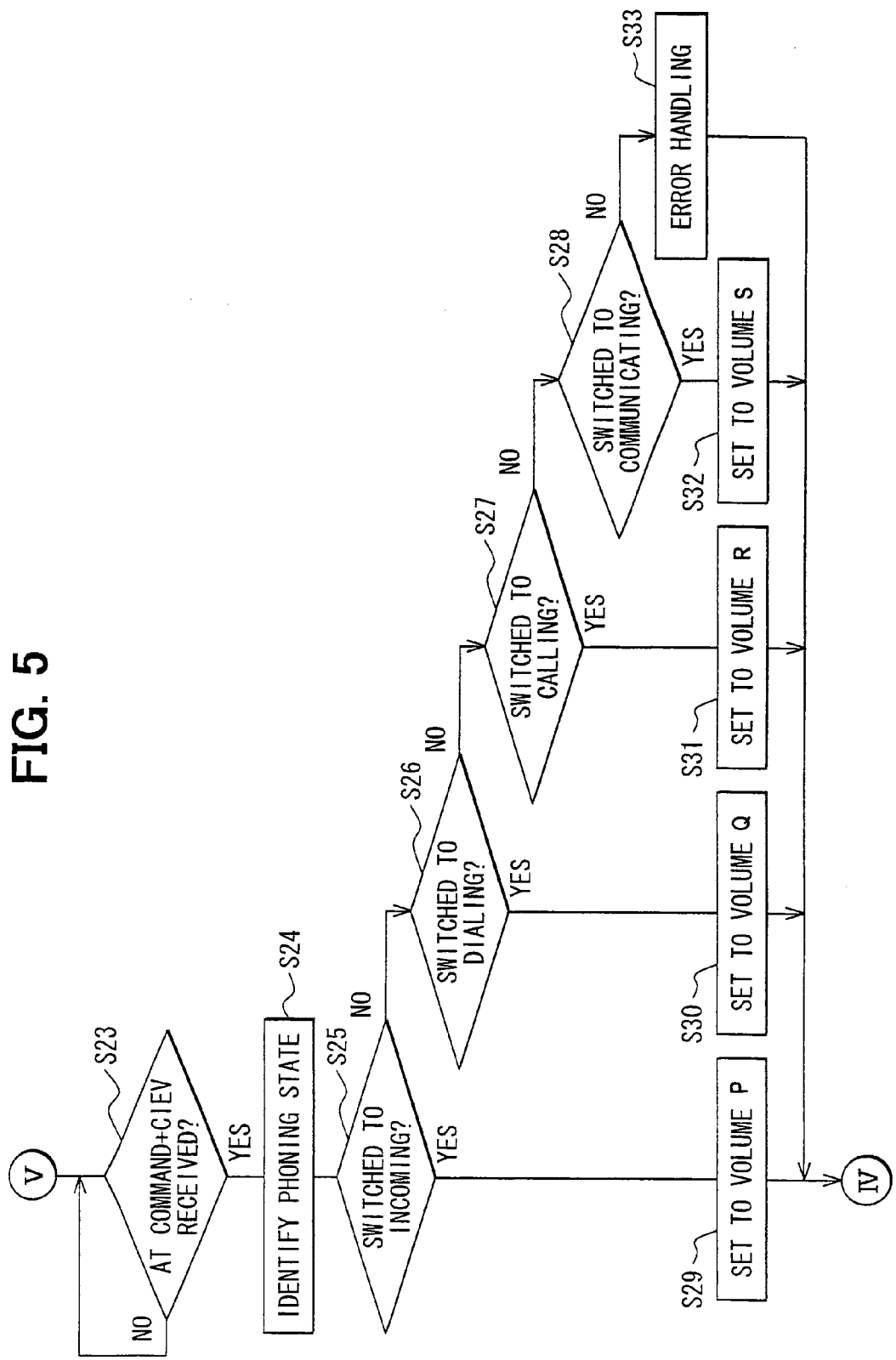
FIG. 5 is another flowchart diagram performed in the configuration shown in FIG. 3.

A navigation system 31 as an example of a second embodiment according to the present invention will be explained with reference to FIGS. 3 to 5. The second embodiment is different from the first embodiment in that: phone communications kinds are identified and sound volumes for an incoming, dialing, calling, and communicating sounds are individually set further based on the identified phone communications kind.

In the navigation system 31, a control unit 32 identifies a phone communications kind set by a user via an operation switch unit 33 as phone communications kind setting means. For instance, when a user operates a usual dialing button without operating an emergency report button and starts a handsfree communications, the control unit 32 identifies the phone communications kind as a usual phone communications. In contrast, when a user operates the emergency report button and starts a handsfree communications, the control unit 32 identifies the phone communications kind as an emergency phone communications. The usual phone communications means a phone communications that a user performs via a handsfree communications while sitting on a driver's seat. In contrast, the emergency phone communications means a phone communications that a user performs via a handsfree communications even when departing from the driver's seat in encountering an accident or in a poor physical condition.

The external memory device 34 stores sound volume levels corresponding to multiple phoning states with respect to each of the usual phone communications and the emergency phone communications, unlike the external memory device 11 in the first embodiment. For instance, the external memory device 34 stores "sound volume level A", "sound volume level B", "sound volume level C", and "sound volume level D" corresponding to the multiple phoning states of the usual phone communications, and, further, "sound volume level P", "sound volume level Q", "sound volume level R", and "sound volume level S" corresponding to the multiple phoning states of the emergency phone communications. These sound volume levels A to D, and P to S may be set individually to any volumes by a user, or may be set as default values, which are set before product shipment.

Next, an operation of the above configuration will be explained with reference to FIGS. 4 and 5. While the navigation system 31 establishes a BLUETOOTH communications link with the cellular phone 21, a start trigger arises to start a handsfree communications. Then the control unit 32 identifies a phone communications kind (Step S21). When the control units 32 detects that the phone communications kind is the usual phone communications, Steps 51 to S11, which are identical to those in FIG. 2, are executed. In sum, when detecting that the BLUETOOTH communications unit 6 receives "AT command +CIEV" from the cellular phone 21, the control unit 32 identifies a phoning state by determining "+CIEV" received. The control unit 32 then causes the speaker 9 to output a sound in a certain sound volume level of the sound volume levels A to D of the usual phone communications stored in the external memory device 34, the certain sound volume level corresponding to the phoning state identified.

In contrast, when the control units 32 detects that the phone communications kind is the emergency phone communications, Steps S23 to S33 are executed similarly to Steps S1 to S11. In sum, when detecting that the BLUETOOTH communications unit 6 receives "AT command +CIEV" from the cellular phone 21, the control unit 32 identifies a phoning state by determining "+CIEV" received. The control unit 32 then causes the speaker 9 to output a sound in a certain sound volume level of the sound volume levels P to S of the emergency phone communications stored in the external memory device 34, the certain sound volume level corresponding to the phoning state identified.

Further, the control unit 32 may identify a phone communications kind as the emergency phone communications also when the cellular phone 21 receives an incoming call from an emergency report service center station.

As explained above, the navigation system 31 is provided as follows: a phone communications kind is also identified as either the usual phone communications or the emergency phone communications; and a sound corresponding to the identified phone communications kind and further corresponding to the identified phoning state is outputted via the speaker 9 in a corresponding sound volume level stored in the external memory device 34. With respect to each of the usual phone communications and emergency phone communications, an incoming sound, dialing sound, calling sound, and communicating sound are individually outputted in appropriately set sound volume levels, which enhances usability of the navigation system 31 for users.

MODIFICATIONS

An in-vehicle handsfree apparatus may be not limited to a navigation system having a handsfree communications function. It may be a stand-alone handsfree apparatus or a handsfree apparatus assembled in a vehicle. A cellular phone may be not limited to a cellular phone having a BLUETOOTH communications function. It may be a cellular phone, to which an external BLUETOOTH adapter is attachable.

A method for communications between an in-vehicle handsfree apparatus and a cellular phone may be not limited to the BLUETOOTH communications. It may be any wireless communications method or any wired communications method such as USB (Universal Serial Bus), and an in-vehicle handsfree apparatus may identify phoning states of a cellular phone even using information on phoning states other than "+CIEV".

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A handsfree apparatus for a vehicle to communicate with a cellular phone, the apparatus comprising:
a sound output unit for outputting a sound;
means for receiving, from the cellular phone, phoning state information indicating a plurality of phoning states of the cellular phone;
means for storing a separate sound volume corresponding to each of the plurality of phoning states;
means for identifying the phoning state of the cellular phone from the phoning state information received by the receiving means, and
means for causing the sound output unit to output a sound corresponding to the identified phoning state in a sound volume, which is stored in the storing means and corresponds to the identified phoning state,
wherein
the storing means further stores a sound volume corresponding to each of the plurality of phoning states with respect to each of a plurality of phone communications kinds, the plurality of communications kinds including a usual phone communications kind and an emergency phone communications kind;
the identifying means further identifies a phone communications kind of the cellular phone from the plurality of phone communications kinds, and the causing means causes the sound output unit to output a sound corresponding to the identified phoning state with respect to the identified phone communications kind in a sound volume, which is stored in the storing means and corresponds to the identified phoning state with respect to the identified phone communications kind, and
when the identifying means identifies a communicating state as one of the plurality of phoning states with respect to the emergency phone communications kind, the causing means causes the sound output unit to switch a sound to a sound volume, which is stored in the storing means and corresponds to the communicating state with respect to the emergency communications kind.

2. The handsfree apparatus of claim 1, further comprising means for setting a phone communications kind by a user, wherein the identifying means identifies the phone communications kind set by the user via the setting means.

3. The handsfree apparatus of claim 1, further comprising:
a display unit for having a display window,
the control means further causing the display unit to visually notify a user of a phoning state change by switching a display in the display window based on the identified phoning state.

4. The handsfree apparatus of claim 1, wherein:
the receiving means receives as the phoning state information AT command +CIEV from the cellular phone, and
the control unit determines the phoning state by determining +CIEV received by the receiving means.

5. The handsfree apparatus of claim 1, wherein
the control means executes an error handling when the storing means does not store a sound volume corresponding to the identified phoning state.

6. The handsfree apparatus of claim 1, wherein:
the plurality of phoning state includes an incoming state, a dialing state, and a calling state in addition to the communicating state.

7. The handsfree apparatus of claim 1, further comprising:
means for answering a call being sent to the cellular phone, the answering means being separate from the cellular phone.

8. A method for setting a sound volume in a handsfree apparatus for a vehicle to communicate with a cellular phone, the method comprising:
storing a sound volume corresponding to each of a plurality of phoning states of the cellular phone with respect to each of a plurality of phone communications kinds, the plurality of communications kinds including a usual phone communications kind and an emergency phone communications kind;
receiving and identifying a phoning state of the cellular phone and a phone communications kind; and
outputting via a sound output unit a sound corresponding to the identified phoning state with respect to the identified communications kind in a sound volume, which is stored and corresponds to the identified phoning state with respect to the identified phone communications kind,
when a communicating state with respect to the emergency communications kind is identified as one of the plurality of phoning state, a sound outputted via the sound output unit is switched to a sound volume corresponding to the communicating state with respect to the emergency communications kind.

9. The method for setting a sound volume according to claim 8, further comprising:
providing means for answering a call being sent to the cellular phone in the handsfree apparatus; and
providing means for initiating a call using the cellular phone in the handsfree apparatus.

10. A handsfree apparatus for a vehicle which communicates with a cellular phone, the apparatus comprising:
means for answering a call being sent to the cellular phone, the answering means being separate from the cellular phone;
means for initiating a call using the cellular phone, the initiating means being separate from the cellular phone;
a sound output unit for outputting a sound;
means for receiving phoning state information indicating a plurality of phoning states from the cellular phone; and
means for storing a separate sound volume for each of the plurality of phoning states with respect to each of a plurality of phone communications kinds;
means for identifying the phoning state of the cellular phone from the phoning state information received from the receiving means; and
means for causing the sound output unit to output a sound corresponding to the identified phoning state in a sound volume stored in the storing means and corresponding to the identified phoning state; wherein
the identifying means further identifies a phone communications kind of the cellular phone from the plurality of phone communications kinds, and the causing means causes the sound output unit to output a sound corresponding to the identified phoning state with respect to the identified phone communications kind in a sound volume, which is stored in the storing means and corresponds to the identified phoning state with respect to the identified phone communications kind.

* * * * *